United States Patent [19]

Brown et al.

[11] Patent Number: 4,483,195

[45] Date of Patent: Nov. 20, 1984

[54] FLUCTUATING PRESSURE MEASURING APPARATUS WITH MINIATURE, HIGH TEMPERATURE, PRESSURE TRANSDUCER

[75] Inventors: William H. Brown, Marietta; Krishan K. Ahuja, Atlanta, both of Ga.

[73] Assignee: Lockheed Corporation, Burbank, Calif.

[21] Appl. No.: 454,002

[22] Filed: Dec. 28, 1982

[51] Int. Cl.$^3$ .................. G01L 11/00; G01L 23/00
[52] U.S. Cl. ........................... 73/702; 73/116; 73/644
[58] Field of Search .............. 73/702, 147, 644, 24, 73/116, 168, 432 R; 367/13; 181/139

[56] References Cited

U.S. PATENT DOCUMENTS 3,677,079 7/1973 Hoeflinger ..................... 73/147
3,964,306 6/1976 Fletcher et al. ................. 73/147 X Primary Examiner—Stephen A. Kreitman
Assistant Examiner—James R. Giebel
Attorney, Agent, or Firm—John J. Sullivan

[57] ABSTRACT

A probe (P) capable of sensing acoustic and hydrodynamic pressures in a heated flow field and an associated apparatus for acoustically exciting the heat flow (35), for positioning the probe (P) within the flow field and fro acquiring data. The probe (P) consists of a miniature microphone (10) mounted in an assembly which provides direct water cooling to the microphone body and which, by means of a bullet nosed extension (23, 24) with lateral ports (25), protects the microphone element (10) from direct impingement of the flow (35). Acoustic excitation of the flow (35) is introduced upstream of the nozzle (34) through a tube (37) from an externally mounted acoustic driver (36) which responds to the amplified output of a signal generator (38); the signal generator (38) and the amplifier (39) are adjusted to control the frequency and amplitude of the excitation. A traversing mechanism (32), capable of movement in three orthogonal directions is used to position the probe (P) within the flow (35). Signals from an acoustic excitation sensor (47) and from the probe (P) are amplified to convenient levels and processed by a two-channel Fast Fourier analyzer (40) which produces the transfer function correlograms and spectra of the input signal individually and jointly displayed on a recorder/indicator (41).

11 Claims, 5 Drawing Figures

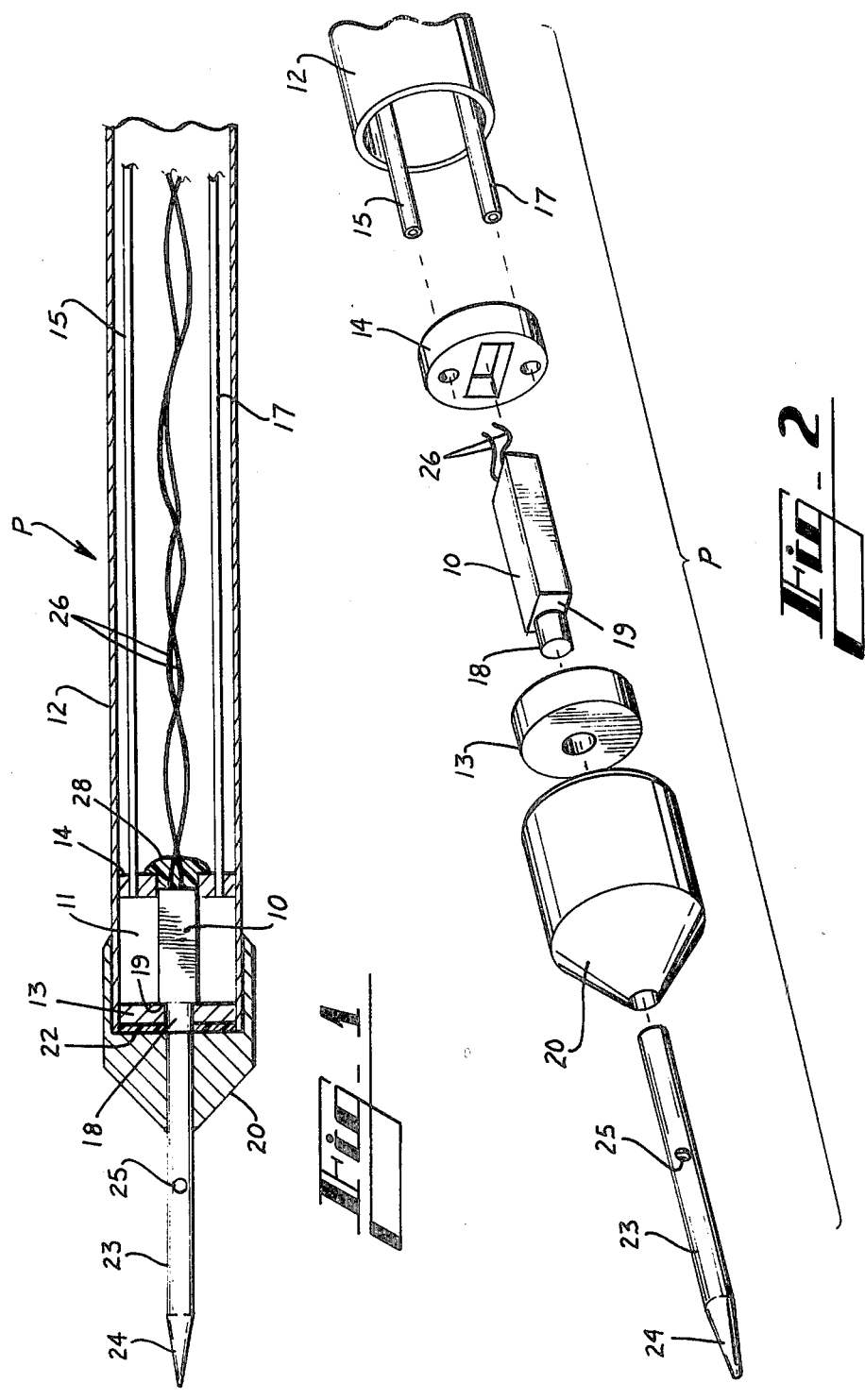

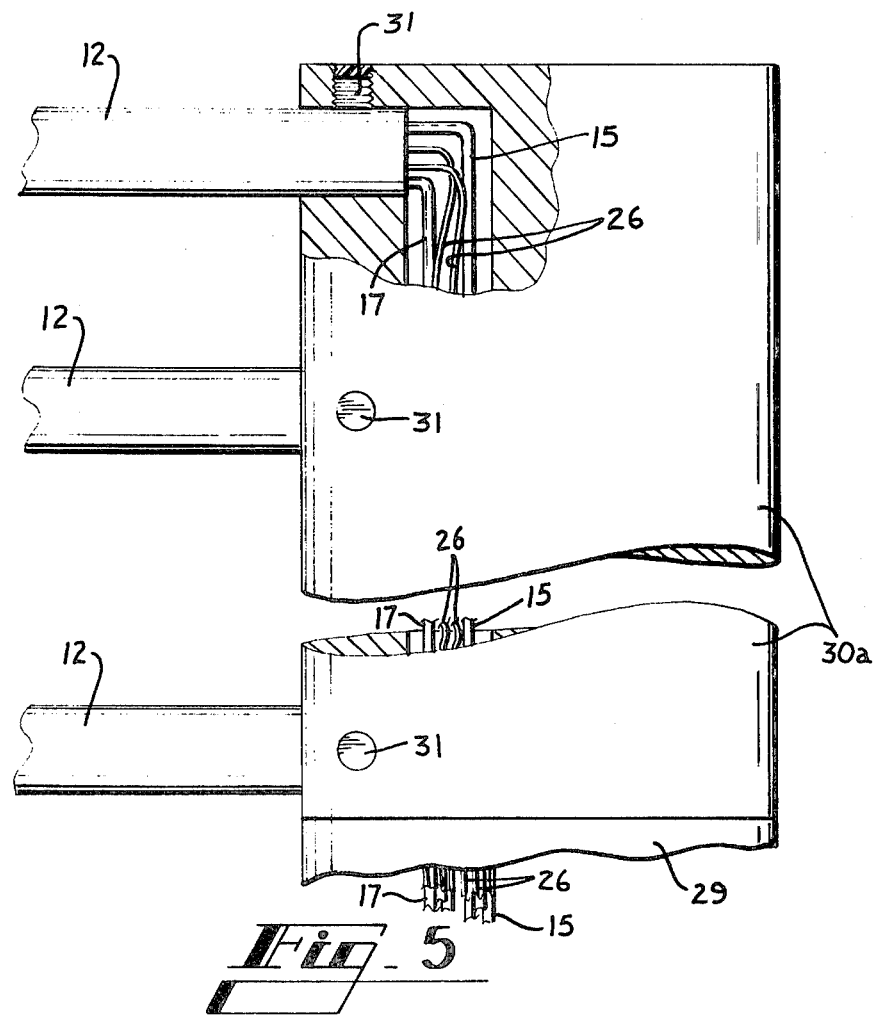

FLUCTUATING PRESSURE MEASURING APPARATUS WITH MINIATURE, HIGH TEMPERATURE, PRESSURE TRANSDUCER

TECHNICAL FIELD

This invention relates to pressure measuring apparatus and more particularly to a fluctuating pressure measuring apparatus and a miniature pressure transducer therefor capable of operating in high temperature environments. In the measurement of acoustic and fluctuating hydrodynamic pressures in a high temperature medium, i.e. on the order of 1500° F. (820° Celsius), it is important for accuracy that the sensing element is located in the medium. Such exposure affects the sensitivity and survivability of the sensing element. Where the high temperature medium is flowing as in the case of engine exhausts, compressor interstage flow and the like the sensing element must be especially designed. In relatively small model scale flows, i.e. on the order of two (2) inches (5.08 cm), a subminiature device is required with an assured adequate sensitivity.

BACKGROUND ART

The last few years have seen a recognition that coherent large-scale turbulence exists even in flow fields previously thought to contain only random, smallscale turbulence. So far, measurement of this turbulence has been possible only in cold flows, mainly because it is easier to work in unheated flows. Where work has been done in heated flows, the practice has been to employ simple pickups or probes in the harsh environment and the sensing element or transducer outside in a more tolerable environment. Alternatively, the transducer is housed within a protective liquid cooled jacket resulting in a large and cumbersome assembly of no use in the small flow fields such as small model jets. Special purpose and very expensive transducers having high temperature resistance have also been resorted to in some cases.

DISCLOSURE OF INVENTION

Prelimininary to the present invention, it is believed that the study, manipulation and use of coherent large-scale turbulence in fluid flow fields will dominate fluid dynamics for the next several years. Also it is believed that the greatest application will be in heated flows, such as jet engine exhausts, power plant emissions, and the like where manipulation of the large-scale turbulence can provide increased efficiency by the promotion of mixing and prevention of flow separation. To understand the characteristics of this large-scale turbulence and thereby, for example, control flow separation on associated surfaces, it is important to be able to measure the fluctuating pressures associated with them. This requires acoustic measurements to be made inside heated flows.

To this end, it is herein proposed to provide a miniature transducer which may be immersed in heated or hot flows, i.e. flows having a temperature on the order of 1500° F. (820° Celsius), with no adverse effects on the pressure sensing element. Essentially, a miniature, high sensitivity transducer is employed in a compact assembly which concentrates a coolant directly on the transducer only and in which low thermal conductivity materials are used to minimize heat loads. A nose cone with specially located static pressure ports is mounted forward of the transducer thereby shielding it from direct impingement of the fluid or hot jet.

By so mounting this transducer within the flow as to permit its adjustment to various positions within the flow, every conceivable aspect of the turbulence may be measured. Where desired, multiple such transducers may be arranged in a rake or the like

BRIEF DESCRIPTION OF THE DRAWINGS

The details of the instant invention will be described in connection with the accompanying drawings, wherein:

FIG. 1 is a longitudinal section taken through a probe assembly housing a transducer designed and constructed in accordance with the teachings hereof to show the several elements which comprise the assembly;

FIG. 2 is a perspective view of the probe assembly shown in FIG. 1 exploded to reveal the elements individualiy as well as the manner in which they are assembled;

FIG. 4 is a view taken along line 4—4 of FIG. 3; and

FIG. 5 is a fragmentary view of the probe assembly mounting illustrative of a rake of several probes to be disposed in the jet stream, a portion of the mounting being broken away.

DETAILED DESCRIPTION AND STRUCTURE OF THE PREFERRED EMBODIMENT

Figure 3:
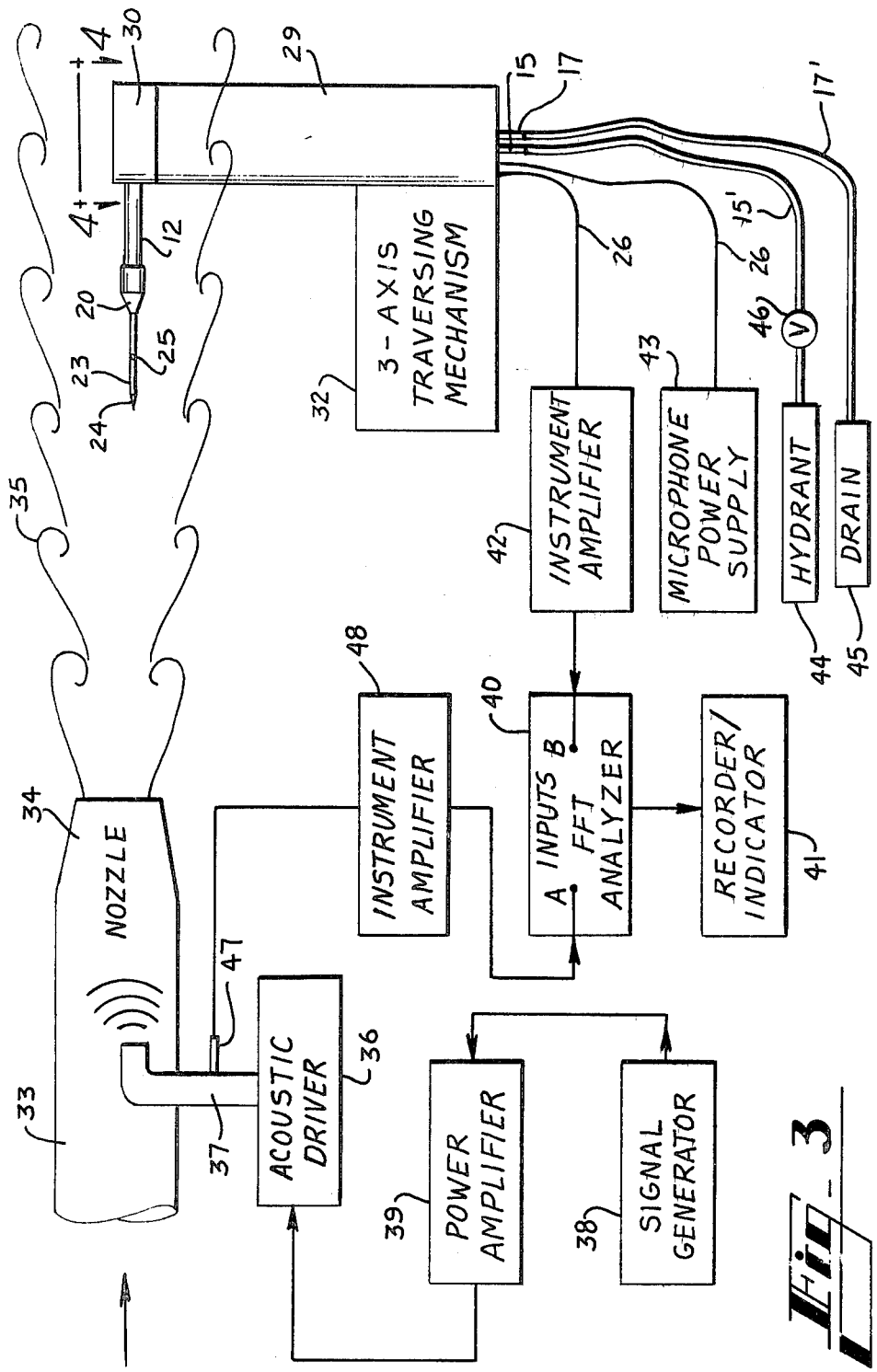
FIG. 3 is a schematic view of an apparatus incorporating the probe assembly of FIGS. 1 and 2 showing it as operatively installed in a high temperature jet stream to detect and record the fluid pressures.

Referring more particularly to FIGS. 1 and 2 of the drawings, which depict the probe assembly of this invention, 10 designates a transducer or microphone enclosed within a coolant jacket 11 located within one end of a containment tube 12. Such a microphone 10 as herein envisioned is available from Knowles Electronic, Inc. 3100 North Mannheim Road, Franklin Park, Ill. 30131 under the identification BL 1785—Ceramic Microphone plus amplifier or the equivalent.

A pair of spaced walls or dams 13 and 14 located adjacent opposite ends of the microphone 10 define the ends of the jacket 11 within the tube 12. A coolant, preferably liquid such as for example water, is supplied to the jacket 11 through an inlet line or conduit 15 whereby to bathe the microphone 10 and then flow out from the jacket 11 through an exit line or conduit 17. This circulation will be described in more detail hereinafter.

The forward end of the microphone 10 terminates in a reduced section extending as a projection 18 which creates a shoulder 19 against which the forward dam 13 abuts. At its forward end the projection 18 terminates in a surface disposed in the plane of the associated end of the tube 12 and constitutes the microphone port.

A fairing 20 in the form of a cup overlies and encloses the foward end of the tube 12 being secured, preferably removably secured, thereto as by press fit, threads or the like. A cavity is thereby created in the end of the tube 12 between the end of the fairing 20 and the forward dam 13. This cavity may be, and preferably is, filled with a high temperature adhesive e.g. epoxy 22 to assure a good-seal against liquid leakage from the jacket 11.

At its opposite or forward end the fairing 20 tapers to substantially a point and is pierced centrally by a bore sized to receive a tubular member 23 which terminates within the fairing 20 in abutment against the projection 18. Thus disposed the member 23 is secured against all relative movement, preferably being welded into the fairing 20.

At its other end the member 23 terminates in a nose cone 24, the member 23 and base of the nose cone 24 having a diameter as small as about 0.050 inch (1.3 mm). One or more static pressure ports 25 are provided in the member 23 each being located no less than about eight (8) diameters of the member 23 from the forwardmost end of the cone 24 and no less than about four (4) diameters of the member 23 from the forwardmost end of the fairing 20. The entire assembly shown in FIG. 1 and described above constitutes a probe P.

Electrical conductors 26 are operatively connected to the aft end of the microphone 10 and extend through and out of the tube 12 to a remote indicator and/or recorder as will be described. A high temperature adhesive, e.g. epoxy 28, fills that portion of the tube 12 in the area of the adjacent ends of the microphone 10 and the dam 14 around the conductors 26 so as to act in conjunction with the adhesive or epoxy 22 at the forward end of the microphone 10 to thereby seal the jacket 11.

The nose cone 24, member 23, fairing 20 and tube 12 i.e. all parts to be exposed to the jet flow are made of high temperature metals, such as for example stainless steel. The member 23 may be, and preferably is, welded to the fairing 20 so that it constitutes a subassembly connectable to the tube 12 as described. Similarly, the aft dam 14 is secured to the coolant lines 15 and 17 which pass through it with an adhesive or epoxy 28 applied as described above with respect to the epoxy 22. These constitute a subassembly within the tube 12 connectable in the fairing 20. This provides good thermal and electrical insulation as well as mechanical support for the microphone 10 and conductors 26. The tube 12, lines 15 and 17 and conductors 26 may be of any length required.

Referring now specifically to FIGS. 3, 4 and 5, an apparatus is shown which incorporates the probe assembly P described above. This probe P is mounted in a support 29 by securing the aft end of the tube 12 in the support 29 adjacent one end thereof. Preferably this is accomplished by means of and through the use of a solid block 20 of stainless steel, for example, welded to the end of the support 29 which is tubular. Both the block 30 and support 29 are aerodynamic or airfoil shape in cross section (FIG. 4).

The block 30 is drilled to receive the end of the tube 12 which is held in place therein by a set-screw 31 the outer surface of which is made to lie flush with the adjacent surface of the block 30 and covered with a high temperature ceramic where necessary to produce a clean aerodynamic surface. The block 30 is also drilled to permit passage of the water lines 15 and 17 and the electrical wires 26 to exit through the tubular support 29. The other end of the tubuler support 29 is attached in any appropriate manner to a traversing mechanism 32 capable of movement in substantially all directions whereby the probe P may be moved in three orthogonal directions, i.e. along the X,Y, and Z axes. Such movement of the mechanism 32 may be accomplished in any conventional manner all well within the present state of the art.

Typically, an exhaust pipe 33 from a jet engine or the equivalent (not shown) terminates in a nozzle 34 through which a jet of exhaust fluid 35 is discharged. This fluid 35 contains coherent large-scale turbulence which determine the behavior of its flow and through an analysis and manipulation of such turbulence the flow can be controlled. To that end an acoustic driver 36 is located externally of the pipe 33 with a duct 37 extending therefrom and into the pipe 33 opening in the direction of fluid flow 35. This driver 36 is actuated by a signal generator 38 and an adjustable power amplifier 39 operatively connected thereto whereby an acoustic signal is introduced within the pipe 33 and the magnitude and frequency of this signal affects the fluid flow 35. The actual excitation of the driver 36 is measured by an acoustic sensor 47 mounted in the side of the duct or tube 37 and raised to a suitable level by an amplifier 48. The power supply for this acoustic sensor 47 is omitted for clarity. Flow excitation signals from the generator 38 are thus concurrently fed into a Fast Fourier Transform (FFT)analyzer 40 such as for example a SD-360 Digital Signal Processor manufactured and sold by Scientific Atlanta, San Diego Division, P.0. Box 671, San Diego, Calif. 92112 where they are compared to inputs received from the probe P. The output from the analyzer 40 are received and transcribed and/or displayed on a recorder/indicator 41.

The inputs to the analyzer 40 from the probe P are transmitted through one of the conductors 26 passing through an amplifier 42, if desired or required. The microphone 10 is excited by an appropriate power supply 43 connected thereto through another of the conductors 26. During this operation the coolant, water, is being circulated from a source or hydrant 44 through line 15, into and out from the jacket 11 line 17 and to a conventional drain 45. A needle valve 46 in the inlet line 15 is employed to adjust the flow rate to prevent the temperature of the water from exceeding about 100° F. (38° C). Excessive flow rate, hence water pressure, is to be avoided lest the water system is ruptured resulting in a failure of the microphone 10.

As indicated above the water lines 15 and 17 and the electrical conductors 26 exit the open end of the support 29. The portions of the lines 15 and 17 to and from the probe P are rigid connecting up with flexible extensions 15' and 17' respectively outside of the heated region caused by the fluid flow 35. The flexible portions 15' and 17' of the water lines as well as the electrical conductors 26 are long enough to permit free movement of the probe P throughout the X,Y and Z region surveyed, as above described.

Referring now to FIG. 5, a modified version of the invention is shown wherein, instead of a single probe P, a rake, i.e. several such probes P disposed in side-by-side position across the fluid flow 35, is employed. In this case a solid block 30a is secured e.g. welded to the end of the tubular support 29 and drilled to receive the ends of a plurality of probes P each of which is held in place therein by a set screw 31 the head of which is flush with the adjacent surface of the block 30a as previously described. The block 30a is also drilled to permit passage of the water lines 15 and 17 and electrical wires 26 associated with and common to the several probes P to exit through the tubular support 29. In all other respects, the apparatus of FIG. 5 is the same as that illustrated and described in connection with FIGS. 1 through 4.

OPERATION OF THE PREFERRED EMBODIMENT

The following description of a typical test operation is referenced to FIG. 3. The purpose of the test is to determine the effect of upstream acoustic excitation on the coherent large scale turbulence of a heated jet.

1. Coolant, viz, water, flow to and around the microphone 10 of the probe P is initiated by opening the needle valve 46 until an adequate volumetric flow rate is measured at the drain 45. After the test is begun, the needle valve 46 is adjusted as required to assure that a temperature of about 100° F. (38° C.) is not exceeded.
2. The signal generator 38 is adjusted to produce a predetermined wave form, usually sinusoidal, at an appropriate frequency which usually will depend on the size, temperature, and velocity of the flow or jet 35. That signal is altered by the amplifier 39 to a power level sufficient to excite the jet 35. The amplified signal is applied to the enclosed acoustic driver 36 which transmits the acoustic signal through the duct or tube 37 into the exhaust pipe 33. The actual excitation signal measured by the acoustic sensor 47 is fed into input A of the analyzer 40.
3. As indicated by the arrow, a flow of heated air or exhaust enters the pipe 33 from the left and issues from the nozzle 34 into the atmosphere. The temperature and velocity of the jet 35 are controlled by usual and well established means. The acoustic signal from the driver tube 37 excites instabilities in the jet 35.
4. The three-axis traversing mechanism 32 which may be manually or automatically controlled is used to position the measuring probe P at the selected measuring location within the flow field of the jet 35. The microphone power supply 43 is switched on to energize the microphone 10.
5. At each probe location point, the pressure signal from the probe P is analyzed and compared with the basic excitation signal from the excitation sensor 47. To accomplish this, the signal from the probe P is raised to a suitable level by the amplifier 42 and applied to input B of the analyzer 40 while the signal from the excitation sensor 47 is raised to a suitable level by the amplifier 48 and is applied to the other analyzer input A. The analyzer 40 provides to the recorder/indicator 41 such information as:
   a. spectrum of each input;
   b. cross-spectrum;
   c. transfer function magnitude and phase;
   d. auto-correlation functions; and
   e. cross-correlation functions;
   These data are analyzed to determine the extent to which the coherent large-scale turbulence of the jet 35 is modified by the acoustic excitation from the driver tube 37.
6. Steps 2–5 above are repeated until the entire range of desired jet velocity; jet temperature; and excitation wave form, frequency, and power level; is covered for each desired location X,Y,Z in the flow field 35.
7. The probe P is moved outside the flow 35 using the traverse mechanism 32 and the heat to the jet in the pipe 33 is turned off. When the pipe 33, nozzle 34, and driver tube 37 are cool, the airflow to the pipe 33 may be cut off. When the probe P and the associated parts 29 and 30 are cooled, the valve 46 is closed to discontinue the flow of cooling water.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

We claim:

1. An apparatus for measuring fluctuating hydrodynamic pressures in a high temperature flowing medium comprising:
   a signal generator operative in said medium to alter the magnitude and frequency of the coherent large-scale turbulence within said medium;
   at least one pressure transducer;
   a support connected to each said transducer whereby each said transducer is mounted in a predetermined position in said medium downstream of said altered turbulence:
   a power supply to excite each said transducer whereby signals corresponding to the altered turbulence aforesaid are detected;
   an analyzer operatively connected between said signal generator and each said transducer to receive and compare the signals therefrom; and
   an indicator connected to the output side of said analyzer to display the results thereof 2. The apparatus of claim 1 including an acoustic driver and power amplifier means operatively connected between said signal generator and said analyzer.

3. The apparatus of claim 1 including a three-axis traversing mechanism operatively connected to said support whereby each said transducer is located in an unlimited number of predetermined positions in said medium.

4. The apparatus of claim 1 wherein said indicator includes a recorder.

5. The apparatus of claim 1 wherein a multiplicity of transducers are employed in a rake.

6. The apparatus of claim 1 including circulating coolant means associated with each said transducer and a control to regulate the flow rate of said coolant means whereby the outlet temperature thereof is maintained at a predetermined level.

7. The apparatus of claim 6 wherein said predetermined temperature level is not more than about 100° F.

8. A pressure transducer adapted to be disposed in a high temperature flowing medium and to measure fluctuating hydrodynamic pressures therein comprising:
   a microphone terminating at its forward end in a port;
   a tubular extension from said port into said flowing medium, said extension terminating up stream in a nose cone;
   at least one static pressure port in said extension between said nose cone and said port;
   a coolant jacket around said microphone;
   an inlet fluid conduit connecting said jacket to a source of coolant fluid; and
   an outlet fluid conduit extending from said jacket to a drain.

9. The transducer of claim 8 wherein said extension is mounted within the forward end of a containment tube and includes a fairing between said containment tube and the aft end of said extension, said extension, containment tube and said fairing being made of a high temperature resisting material.

10. The transducer of claim 8 including a fairing between said microphone port and said extension and wherein said extension including the base of said nose cone has a diameter of about 0.050 inch and each said static pressure port is located not less than about eight extension diameters from the forwardmost end of said nose cone and not less than about four extension diameters from the forwardmost end of said fairing.

11. The transducer of claim 10 wherein said extension and said fairing are made of stainless steel.

* * * * *